United States Patent
Lee et al.

(10) Patent No.: US 11,212,536 B2
(45) Date of Patent: Dec. 28, 2021

(54) NEGATIVE REGION-OF-INTEREST VIDEO CODING

(71) Applicant: Sony Interactive Entertainment Inc., Tokyo (JP)

(72) Inventors: Hung-Ju Lee, Pleasanton, CA (US); Rathish Krishnan, Los Gatos, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 61 days.

(21) Appl. No.: 15/650,787

(22) Filed: Jul. 14, 2017

(65) Prior Publication Data
US 2019/0020879 A1    Jan. 17, 2019

(51) Int. Cl.
| | | |
|---|---|---|
| *H04N 19/167* | (2014.01) | |
| *H04N 19/124* | (2014.01) | |
| *H04N 19/172* | (2014.01) | |
| *H04N 19/196* | (2014.01) | |
| *H04N 19/176* | (2014.01) | |
| H04N 19/159 | (2014.01) | |
| H04N 19/186 | (2014.01) | |

(52) U.S. Cl.
CPC ......... *H04N 19/167* (2014.11); *H04N 19/124* (2014.11); *H04N 19/172* (2014.11); *H04N 19/176* (2014.11); *H04N 19/196* (2014.11); H04N 19/159 (2014.11); H04N 19/186 (2014.11)

(58) Field of Classification Search
CPC ... H04N 19/124; H04N 19/172; H04N 19/196
See application file for complete search history.

(56) References Cited

U.S. PATENT DOCUMENTS

| | | | |
|---|---|---|---|
| 6,678,854 B1 * | 1/2004 | Irvin | H03M 13/05 370/333 |
| 6,700,932 B2 | 3/2004 | Shen et al. | |
| 6,700,935 B2 | 3/2004 | Lee | |
| 7,145,946 B2 | 12/2006 | Lee | |
| 7,426,296 B2 | 9/2008 | Lee et al. | |
| 7,697,608 B2 | 4/2010 | Lee | |
| 7,697,783 B2 | 4/2010 | Lee et al. | |

(Continued)

OTHER PUBLICATIONS

Merriam-Webster Online Dictionary definition of "obscure" downloaded from https://www.merriam-webster.com/dictionary/obscure on Jan. 22, 2019.

*Primary Examiner* — Md N Haque
(74) *Attorney, Agent, or Firm* — JDI Patent; Joshua D. Isenberg; Robert Pullman

(57) ABSTRACT

A method, system, and computer readable medium for encoding one or more input digital frames with obscured negative regions of interest. The method comprising, comparing frame data to mask data for one or more sections of an input digital frame to determine whether or not a given section of the input digital frame is to be obscured, setting one or more encoding parameters to values that result in corresponding obscured sections when decoded after encoding for each section of the frame that is to be obscured, encoding the one or more sections of the input digital frame to generate corresponding encoded frame data and storing or transmitting the encoded frame data.

22 Claims, 5 Drawing Sheets

(56) References Cited

U.S. PATENT DOCUMENTS

| | | | |
|---|---|---|---|
| 7,929,608 B2 | 4/2011 | Krishnan | |
| 8,027,384 B2 | 9/2011 | Lee | |
| 8,077,769 B2 | 12/2011 | Krishnan | |
| 8,184,699 B2 | 5/2012 | Krishnan | |
| 8,218,627 B2 | 7/2012 | Lee | |
| 8,218,641 B2 | 7/2012 | Wang | |
| 8,345,750 B2 | 1/2013 | Lee | |
| 8,379,718 B2 | 2/2013 | Wang et al. | |
| 8,594,190 B2 | 11/2013 | Wu et al. | |
| 8,711,933 B2 | 4/2014 | Lee | |
| 8,737,485 B2 | 5/2014 | Zhang et al. | |
| 8,848,799 B2 | 9/2014 | Krishnan et al. | |
| 8,879,623 B2 | 11/2014 | Lee | |
| 8,913,664 B2 | 12/2014 | Lee | |
| 8,965,140 B1* | 2/2015 | Xu | H04N 19/176 382/244 |
| 9,247,248 B2 | 1/2016 | Wang et al. | |
| 9,386,317 B2 | 7/2016 | Lee | |
| 9,872,018 B2 | 1/2018 | Lee et al. | |
| 2002/0126754 A1 | 9/2002 | Shen et al. | |
| 2003/0026336 A1 | 2/2003 | Lee | |
| 2003/0156198 A1 | 8/2003 | Lee | |
| 2005/0100231 A1* | 5/2005 | Wang | H04N 19/132 382/236 |
| 2005/0169369 A1 | 8/2005 | Lee | |
| 2005/0169370 A1 | 8/2005 | Lee | |
| 2005/0207643 A1 | 9/2005 | Lee et al. | |
| 2007/0025621 A1* | 2/2007 | Lee | H04N 19/14 382/232 |
| 2007/0198963 A1* | 8/2007 | Granik | G03F 1/36 716/52 |
| 2007/0237224 A1 | 10/2007 | Krishnan | |
| 2007/0237235 A1 | 10/2007 | Krishnan | |
| 2007/0274396 A1 | 11/2007 | Zhang et al. | |
| 2008/0181311 A1 | 7/2008 | Zhang et al. | |
| 2010/0074338 A1* | 3/2010 | Yamori | H04N 19/124 375/240.16 |
| 2010/0150227 A1 | 6/2010 | Lee | |
| 2010/0150228 A1 | 6/2010 | Lee | |
| 2011/0051806 A1* | 3/2011 | Lee | H04N 19/126 375/240.03 |
| 2011/0051809 A1 | 3/2011 | Lee | |
| 2011/0051811 A1 | 3/2011 | Wang et al. | |
| 2011/0051813 A1 | 3/2011 | Krishnan et al. | |
| 2011/0158317 A1 | 6/2011 | Krishnan | |
| 2012/0033730 A1 | 2/2012 | Lee | |
| 2012/0177248 A1* | 7/2012 | Shuster | H04W 12/02 382/100 |
| 2013/0072299 A1 | 3/2013 | Lee | |
| 2013/0114697 A1* | 5/2013 | Siddaramanna | H04N 19/124 375/240.03 |
| 2013/0156103 A1 | 6/2013 | Wang et al. | |
| 2014/0087877 A1 | 3/2014 | Krishnan | |
| 2014/0161172 A1 | 6/2014 | Wang et al. | |
| 2014/0233640 A1 | 8/2014 | Lee | |
| 2015/0016513 A1 | 1/2015 | Lee | |
| 2016/0012855 A1 | 1/2016 | Krishnan | |
| 2016/0088299 A1 | 3/2016 | Lee | |
| 2016/0094846 A1 | 3/2016 | Lee | |
| 2016/0381386 A1 | 12/2016 | Krishnan et al. | |
| 2017/0034538 A1 | 2/2017 | Lee | |
| 2017/0289551 A1 | 10/2017 | Lee | |
| 2017/0302918 A1* | 10/2017 | Mammou | H04N 19/162 |
| 2018/0007362 A1 | 1/2018 | Krishnan | |
| 2018/0007365 A1* | 1/2018 | Lawrence | H04N 19/17 |
| 2018/0192058 A1 | 7/2018 | Chen et al. | |

* cited by examiner

NEGATIVE REGION-OF-INTEREST VIDEO CODING

FIELD OF THE DISCLOSURE

Aspects of the present disclosure are related to encoding and decoding of digital data for streaming applications. In particular, the present disclosure is related to obscuring certain regions of streaming video.

BACKGROUND

Digital signal compression (sometimes referred to as video coding or video encoding) is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; AVC (H.264), and HEVC (H.265). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

Since the first introduction of video there has been a need to eliminate information from video without interrupting the viewer's experience. In classic reel to reel films artists might be hired to air brush or paint out certain parts of video frames to eliminate extraneous information that the director did not want the viewer to see. This was a time consuming process and destroyed the original image of the painted film. With the advent of computers editing video no longer required a painter to paint over sections of film. Now an artist could simply edit out and blend whatever section the director desired. Still this process is time consuming and destroyed the original image of the edited video. Furthermore editing each image could not be done quickly in a streaming video environment where the video is not available for editing hours before viewing.

In the context of streaming video, masking is currently used to eliminate information from video. To do this a video system is given a mask, which could be a series of black pixels, and told a location to apply the mask. The video system then can pull the mask from memory and place the mask in the desired location after encoding. This method has numerous problems. In some situations there may be limitations on the size of the mask due to the nature of the DMA process. By way of example, to avoid slowing down the mask data may need to cover at least 64×16 pixels (4 MB wide by 1 MB high). Additionally timing between frame and mask may need to be synchronized, which can be difficult to do without special synchronization information or a person aligning the frame and mask. Also, it's not visually pleasing to see a black box over a video frame.

Thus there is a need for a way to eliminate information from a video stream that does not require the whole video before viewing, does not have size limitations or synchronization issues, and is visually pleasing.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Current techniques used to eliminate information from video involve either editing the video before encoding or after encoding to occlude or hide the undesired information. Both of these techniques present problems in the context of streaming videos. According to aspects of the present disclosure these problems may be solved by eliminating the information during the encoding step of the video stream.

Figure 1:
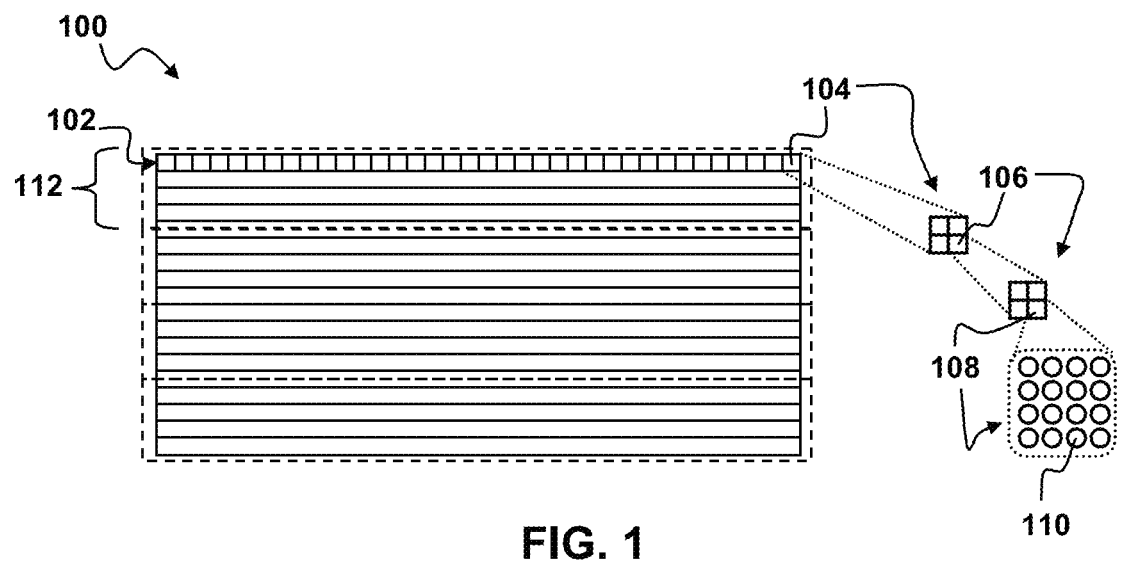
FIG. 1 is a schematic diagram illustrating one possible division of a streaming data picture within the context of aspects of the present disclosure.

A system may implement a method for encoding video represented by a stream of pictures by way of example, and not by way of limitation, as shown in FIG. 1, a single picture 100 (e.g., a digital video frame) may be broken down into one or more sections. As used herein, the term "section" can refer to a group of one or more pixels within the picture 100. A section can range from a single pixel within the picture, up to the whole picture. Non-limiting examples of sections include slices (e.g., macroblock rows) 102, macroblocks 104, sub-macroblocks 106, blocks 108 and individual pixels 110. Other examples include Coding Tree Blocks (CTB) and other section types that are specific to the HEVC (H.265) coding standard. As illustrated in FIG. 1, each slice 102 contains one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each 16×16 pixel macroblock 104 may be broken down into four 8×8 pixel sub-macroblocks 106. Each sub-macroblock may be broken down into four blocks 108 and each block may contain a four by four arrangement of sixteen pixels 110.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors or other light emitting elements used to illuminate the pixels in the display combined with the persistence of vision results in the two fields being perceived as a continuous image. For certain display devices, such as liquid crystal displays, it may be necessary to interlace the two fields into a single picture before being displayed. Streaming data representing encoded images typically includes information indicating whether the image is a field or a frame. Such information may be included in a header to the image.

Modern video coder/decoders (codecs), such as MPEG2, MPEG4 and H.264 generally encode video frames as one of three basic types known as Intra-Frames, Predictive Frames and Bipredicitve Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames. Video frames are often encoded as I-frames when a scene change is detected in the input video.

P-frames require the prior decoding of some other picture(s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of either an I-frame or a P-frame in order to be decoded. Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). In H.264, there are two types of B-frame, a reference B-frame and non-reference B-frame. A reference B-frame can be used as a reference frame for B-frame coding and a non-reference B-frame cannot. Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

Figure 2:
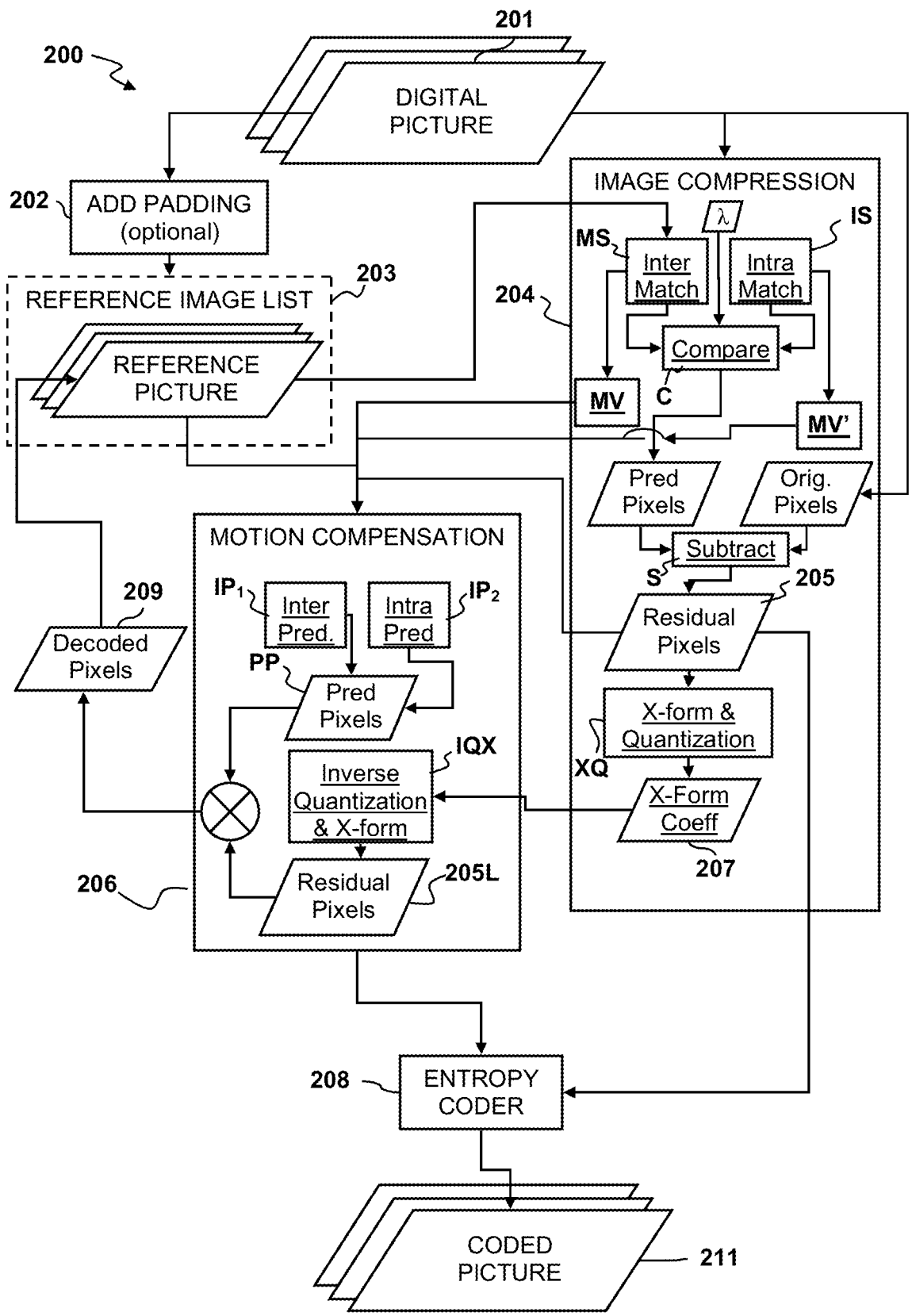
FIG. 2 is a flow diagram illustrating conventional digital picture encoding that may be used in conjunction with aspects of the present disclosure.

By way of example, and not by way of limitation, digital pictures may be encoded according to a generalized method 200 as illustrated in FIG. 2. The encoder receives a plurality of digital images 201 and encodes each image. Encoding of the digital picture 201 may proceed on a section-by-section basis. The encoding process for each section may optionally involve padding 202, image compression 204 and motion compensation 206. To facilitate a common process flow for both intra-coded and inter-coded pictures, all un-decoded pixels within a currently processing picture 201 may optionally be padded with temporary pixel values to produce a padded picture, as indicated at 202. Padding the picture at 202 facilitates the use of a currently-processing picture as a reference picture in subsequent processing during image compression 204 and motion compensation 206. Such padding is described in detail in commonly-assigned U.S. Pat. No. 8,218,641, which is incorporated herein by reference.

As used herein, image compression refers to the application of data compression to digital images. The objective of the image compression 204 is to reduce redundancy of the image data for a give image 201 in order to be able to store or transmit the data for that image in an efficient form of compressed data. The image compression 204 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 201 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 204 may include region of interest coding in which certain parts of the image 201 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 204 the encoder may search for the best way to compress a block of pixels. The encoder can search all of the reference pictures in the reference picture list 203, including the currently padded picture, for a good match. If the current picture (or subsection) is coded as an intra picture, (or subsection) only the padded picture is available in the reference list. The image compression at 204 produces a motion vector MV and transform coefficients 207 that are subsequently used along with one or more of the reference pictures (including the padded picture) during motion compensation at 206.

The image compression 204 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 205. The residual pixels then undergo a transform and quantization XQ to produce transform coefficients 207. The transform is typically based on a Fourier transform, such as a discrete cosine transform (DCT).

The transform outputs a set of coefficients, each of which is a weighting value for a standard basis pattern. When combined, the weighted basis patterns re-create the block of residual samples. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. For a low QP value, more non-zero coefficients remain after quantization, resulting in better decoded image quality but lower compression. Conversely, for a high QP value, fewer non-zero coefficients remain after quantization, resulting in higher image compression but lower image quality.

The inter/intra comparison C, also referred to as a mode decision uses a parameter known as a Lagrange multiplier $\lambda$ that is related to QP. Basically, a cost function J is computed using a value of $\lambda$ determined from the value of QP. The encoding mode is determined based on whether the computed cost function J for inter mode coding is above or below a computed cost for intra mode coding. By way of example, the H.264/AVC codec supports a cost function $J_H$, which should be minimized by computing the actual bit consumption R for encoding the overhead (e.g., motion vectors, types) of the section and the reconstruction distortion D (measured, e.g., as a sum of absolute differences, SAD between the original and reconstructed sections). In such a case, the cost function $J_H$ is computed according to $$J_H = D + \lambda \cdot R.$$

In alternative implementations, the distortion D may be calculated differently. There are many ways to represent the distortion, for example, sum of squared differences (SSD), sum of absolute transformed differences (SATD), mean absolute difference (MAD), and the like. Those skilled in the art will recognize that for different distortion measures, the cost function has to be modified or re-tuned accordingly.

Under some circumstances, an improper encoding mode decision can trigger an unnecessary IDR or I-frame insertion. Consider an example of steaming video during online video gaming. The encoder tries to meet a target bit rate for the video stream that is generated by a game application. The target bit rate is related to the number of bits per frame. If the game is paused, the video is essentially a stream of still frames. For a still frame, the QP is low in order to meet the target bits for the frame in rate distortion optimization process. When QP is low, the mode decision selects intra coding for most sections (e.g., macroblocks) in a still frame. If the number of intra-coded sections in a frame is above a threshold the codec triggers a scene-change detection and the next frame is coded as an intra frame with extremely low QP, which requires a large number of bits to encode. This is due to the fact that extremely low values of QP (e.g., QP=1, 2) implies nearly lossless coding in this case. By way of example, and not by way of limitation, the threshold for triggering scene change detection may be about 60-80% intra MB in a frame. A sequence of still frames causes in a sequence of scene change detections even though basically the same frame is being repeated. The sequence of intra-frames can cause large and frequent spikes of bit rate usage in a bandwidth-limited communication channel.

Normally relationship between $\lambda$ and QP is fixed by the codec and is the same for all pictures. In some circumstances, the relationship between $\lambda$ and QP can be adjusted from picture to picture depending on the number of bits per section in a picture. According to aspects of the present disclosure $\lambda$ and QP may be disregarded and QP may be set to a maximum value for a section based on mask data. Specifically, the rate control algorithm used to find the ideal QP value based on rate-distortion optimization may be bypassed.

In some embodiments adjustment to the relationship between $\lambda$ and QP may depend on the number of bits in a section (NBS), which generally depends on the target bitrate (e.g., in bits per second), the frame rate (e.g., in frames per second), and the number of sections in a frame. The number of bits in a section NBS can be calculated by dividing the target bitrate BR by the product of the frame rate FR and the number of sections per frame NSF. By way of example, and not by way of limitation, this can be expressed as:

$$NBS = BR/(FR \cdot NSF)$$

More generally, the number of bits per section (NBS) may be more broadly expressed as NBS=(BPF)/(NSF), where BPF is the target number of bits per frame.

This broadened expression allows for the possibility that the value of NBS could be different from frame to frame, depending, e.g., on the target bits allocated by the underlying rate control scheme. In the case of a fixed target number of bits for each frame BPF becomes BR/FR.

The number of sections (e.g., MB) per frame depends on the resolution. The change to the table can be triggered by a combination of resolution, frame rate, and bit rate. E.g., a table change would be triggered for a frame having 960 by 540 resolution, a frame rate of 30 fps, and a target rate of 8-10 Mbps or higher. For a given bitrate and frame rate a table change is less likely to be triggered if the resolution increases. For a given bitrate and resolution a table change is less likely to be triggered if the frame rate increases. For a given frame rate and resolution a table change is less likely to be triggered if the bitrate decreases.

The relationship between $\lambda$ and QP is typically nonlinear. Generally, when QP is high $\lambda$ is high and when QP is low $\lambda$ is low. Examples of relationships between $\lambda$ and QP are described in U.S. patent application Ser. No. 14/493,238 filed Sep. 22, 2014 and granted as U.S. Pat. No. 9,386,317, the entire contents of which are been incorporated herein by reference.

The QP value can be adjusted depending on the target bitrate. Since QP controls bit usage in encoding, many encoding programs utilize a rate controller that adjusts QP in order to achieve a desired bitrate. The encoder receives uncompressed source data (e.g., an input video) and produces compressed output. The video coding method typically uses a QP value that affects the bit usage for encoding a video section and therefore affects the bitrate. Generally, lower bit usage results in a higher bitrate. A rate controller determines a QP value based on a demanded bitrate, which may be specified by an external application. The encoder uses the QP value determined by the rate controller and determines the actual resulting bit usage and bit rate. The rate controller can use the actual bit rate to adjust the QP value in a feedback loop.

According to aspects of the present disclosure the rate controller may be set to demand a maximum QP value for certain sections based on mask data. In addition, the mode decision stage may be configured to force certain sections defined by mask data to be intra-coded sections.

When not forced to encode at a maximum QP value by mask data, the relationship between the bitrate and the value of the QP depends partly on the complexity of the image being. The bitrate versus QP relationship can be expressed in terms of a set of curves with different curves for different levels of complexity. The heart of the algorithm implemented by the rate controller is a quantitative model describing a relationship between QP, actual bitrate and some measure of complexity. The relevant bitrate and complexity are generally associated only with the differences between source pixels and predicted pixels (often referred to as residuals) because the quantization parameter QP can only influence the detail of information carried in the transformed residuals.

Complexity generally refers to amount of spatial variation within a picture or part of the picture. On a local level, e.g., block or macroblock level, the spatial variation may be measured by the variance of the pixel values within the relevant section. However, for a video sequence, complexity may also relate to the temporal variation of a scene of a sequence of images. For example, a video sequence consists of one object having substantial spatial variation that translates slowly across the field of view, may not require very many bits because temporal prediction can easily capture the motion using a single reference picture and a series of motion vectors. Although it is difficult to define an inclusive video complexity metric that is also easy to calculate, the Mean Average Difference (MAD) of the prediction error (difference between source pixel value and predicted pixel value) is often used for this purpose.

It is noted that the quantization parameter QP may be determined from multiple factors including, but not limited to the picture type of the source picture, a complexity of the source picture, an estimated target number of bits and an underlying rate distortion model. For example, QP may be determined on a section-by-section basis using a variation for a section of the currently encoding picture, e.g., a section (e.g., MB) variance. Alternatively, QP for a currently encoding section may be determined using an actual bit count for encoding a co-located section (e.g., MB) in a previous frame. Examples of such QP level calculations are described, e.g., in commonly assigned U.S. Patent Application Publication No. 2011/0051806, now U.S. Pat. No. 8,879,623 to Hung-Ju Lee, which is incorporated herein by reference.

Motion search and prediction depend on the type of picture being encoded. Referring again to FIG. 2, if an intra picture is to be coded, the motion search MS and inter/intra comparison C are turned off. However, in some implementations, if a padded picture is available as a reference, these functions are not turned off. Consequently, the image compression 204 is the same for intra-coded pictures and inter-coded pictures in such implementations. However, if the picture is encoded as an intra coded picture, there is no need to enable motion search MS and comparison C regardless of whether it is padded or not.

The motion search MS may generate a motion vector MV by searching the picture 201 for a best matching block or macroblock for motion compensation as is normally done for an inter-coded picture. If the current picture 201 is an intra-coded picture, by contrast, existing codecs typically do not allow prediction across pictures. Instead all motion compensation is normally turned off for an intra picture (e.g., I-frame) and the picture coded by generating transform coefficients and performing pixel prediction. Only certain intra modes are allowed for prediction. With some selected intra modes, the predicted MB is constructed, then the residuals between the original MB and its predicted MB are obtained. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do motion compensation at 206. However, these functions are conventionally turned off for encoding of intra pictures.

As used herein, motion compensation refers to a technique for describing a picture in terms of the transformation of a reference image to a currently processing image. In general, the motion compensation 206 acts as a local decoder within the encoder implementing the encoding process 200. Specifically, the motion compensation 206 includes inter prediction IP1 and (optionally) intra prediction IP2 to get predicted pixels PP using the motion vector MV or MV' from the image compression 204 and reference pixels from a picture in the reference list. Inverse quantization and inverse transformation IQX using the transform coefficients 207 from the image compression 204 produce lossy residual pixels 205L which are added to the predicted pixels PP to generate decoded pixels 209. The decoded pixels 209 are inserted into the reference picture and are available for use in image compression 204 and motion compensation 206 for a subsequent section of the currently-processing picture 201. After the decoded pixels have been inserted, un-decoded pixels in the reference picture may undergo padding 202.

In some encoder implementations, if the current picture is intra coded, the inter-prediction portions of motion compensation 206 are turned off because there are no other pictures that can be used for motion compensation. Alternatively, motion compensation may be performed on any picture 201 independent of whether a particular picture is to be inter-coded or intra-coded. In some implementations, the encoder implementing may be modified to add the padded picture to the reference picture list 203 and the inter-prediction portions of the motion compensation 206 are not turned off, even if the currently processing image is to be intra coded. As a result, the process flow for both inter coded sections and intra coded sections is the same during motion compensation 206. The only major difference is the selection of the reference picture to be used for encoding. It is noted that in some implementations, motion-compensation need not be performed on all pictures, and padded pictures need not be added to the reference picture list.

By way of example, and not by way of limitation, in one type of motion compensation, known as block motion compensation (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. This shift is represented by a motion vector MV. To exploit the redundancy between neighboring block vectors, (e.g. for a single moving object covered by multiple blocks) it is common to encode only the difference between a current and previous motion vector in a bit-stream. The result of this differencing process is mathematically equivalent to a global motion compensation capable of panning. Further down the encoding pipeline, the method 200 may optionally use entropy coding 208 to take advantage of the resulting statistical distribution of the motion vectors around the zero vector to reduce the output size.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Block motion compensation divides up a currently encoding image into non-overlapping blocks, and computes a motion compensation vector that indicates where those blocks come from in a reference image. The reference blocks typically overlap in the source frame. Some video compression algorithms assemble the current image out of pieces of several different reference images in the reference image list 203.

The result of the image compression 204 and motion compensation 206 and (optionally) entropy coding 208 is a set of data 211 referred to for convenience as a coded picture. The motion vector MV, (and/or intra prediction mode motion vector MV') and transform coefficients 207 may be included in the coded picture 211. Once a digital picture or other form of streaming data has been encoded, the encoded data may be transmitted and then decoded.

Figure 3:
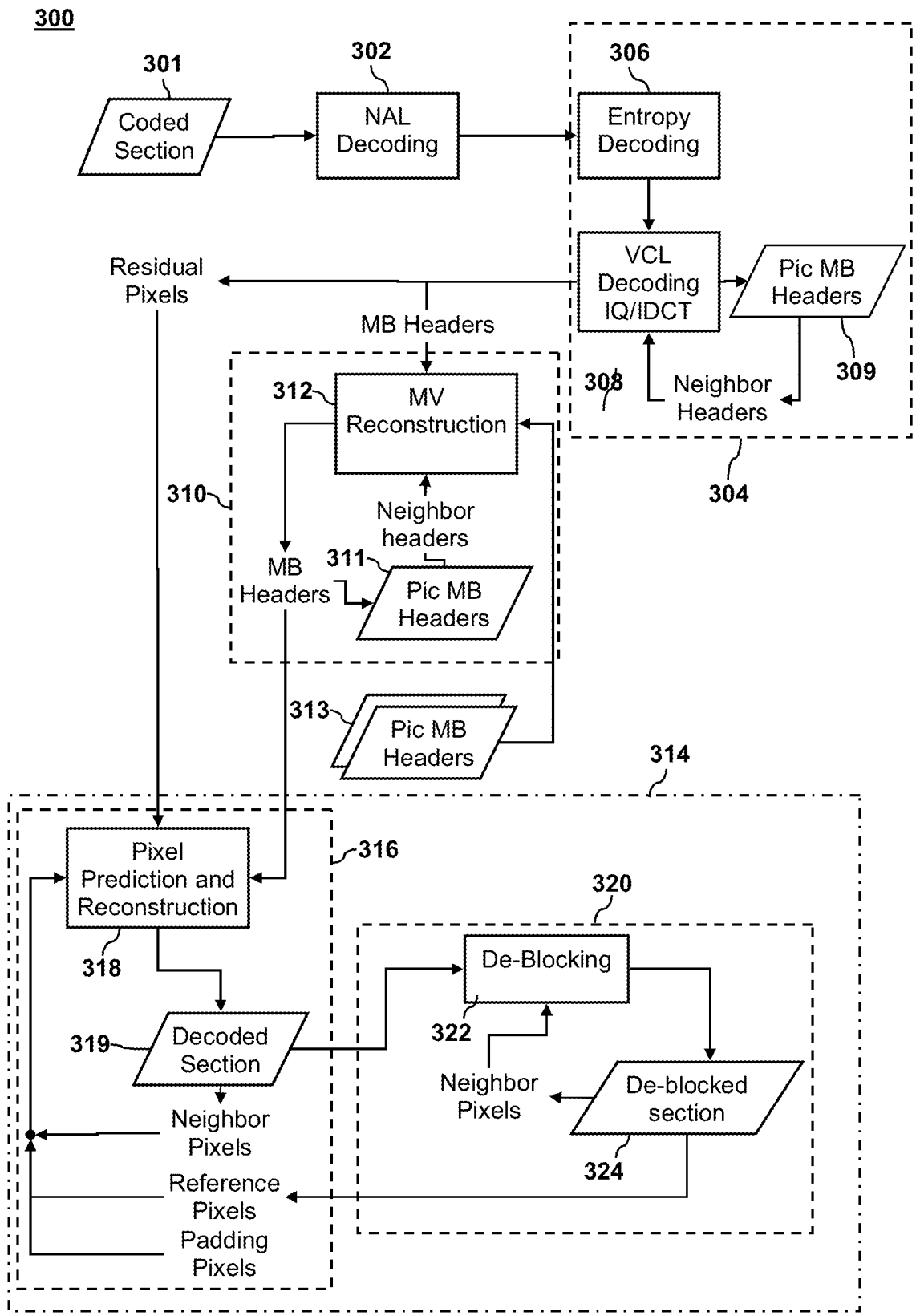
FIG. 3 is a flow diagram illustrating an example of a possible process flow in streaming data decoding that may be used in conjunction with aspects of the present disclosure.

FIG. 3 illustrates an example of a possible process flow in a method 300 for decoding of streaming data 301 that may be used in conjunction with aspects of the present disclosure. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. The Network Abstraction Layer (NAL) is a part of streaming data standards, such as the H.264/AVC and HEVC video coding standards. The main goal of the NAL is the provision of a "network-friendly" representation of streaming data for "conversational" (e.g., video telephony) and "non-conversational" (storage, broadcast, or streaming) applications. NAL decoding may remove from the data 301 information added to assist in transmitting the data. Such information, referred to as a "network wrapper" may identify the data 201 as video data or indicate a beginning or end of a bitstream, bits for alignment of data, and/or metadata about the video data itself.

In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section. Due to its complexity, NAL decoding is typically done on a picture and slice level. The smallest NAL buffer used for NAL decoding is usually slice sized. The example illustrated in FIG. 3 is described in terms of macroblocks and the AVC (H.265) standard. However, these are not limiting features of aspects of the present disclosure. For example, in the latest H265 (HEVC) standard, there is no macroblock concept. Instead, more flexible Coding Unit (CU), Prediction Unit, (PU), Transform Unit (TU) concepts are introduced. Aspects of the present disclosure may operate in conjunction with such coding standards.

In some embodiments, after NAL decoding at 302, the remaining decoding illustrated in FIG. 3 may be implemented in three different thread groups or task groups referred to herein as video coded layer (VCL) decoding 304, motion vector (MV) reconstruction 310 and picture reconstruction 314. The picture reconstruction task group 214 may include pixel prediction and reconstruction 316 and post processing 320. In some embodiments, these tasks groups may be chosen based on data dependencies such that each task group may complete its processing of all the macroblocks in a picture (e.g., frame or field) or section before the macroblocks are sent to the next task group for subsequent processing.

Certain coding standards may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 304 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC (H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC (H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC (H.264) bitstreams. Decoding the entropy layer of AVC (H.264)-coded data streams can be computationally intensive and may present challenges for devices that decode AVC (H.264)-coded bitstreams using general purpose microprocessors. For this reason, many systems use a hardware decoder accelerator.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 210 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallelized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded sections 319 (e.g. decoded blocks or macroblocks) that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

The post processing task group 320 may include a de-blocking filter 322 that is applied to blocks in the decoded section 319 to improve visual quality and prediction performance by smoothing the sharp edges which can form between blocks when block coding techniques are used. The de-blocking filter 322 may be used to improve the appearance of the resulting de-blocked sections 324.

The decoded section 319 or de-blocked sections 324 may provide neighboring pixels for use in de-blocking a neighboring macroblock. In addition, decoded sections 319 including sections from a currently decoding picture may provide reference pixels for pixel prediction and reconstruction 318 for subsequent macroblocks. It is during this stage that pixels from within the current picture may optionally be used for pixel prediction within that same current picture as described above, independent of whether the picture (or subsections thereof) is inter-coded or intra-coded. De-blocking 320 may be parallelized on a macroblock level for macroblocks in the same picture.

The decoded sections 319 produced before post processing 320 and the post-processed sections 324 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 319 is saved in the output picture buffer. Later, the post processed sections 324 replace the decoded sections 319 in the output picture buffer. For non-H.264 cases, the decoder only saves decoded sections 319 in the output picture buffer.

The post processing is done at display time and the post processing output may not share the same buffer as the decoder output picture buffer.

Negative Region-of-Interest Coding

Figure 4:
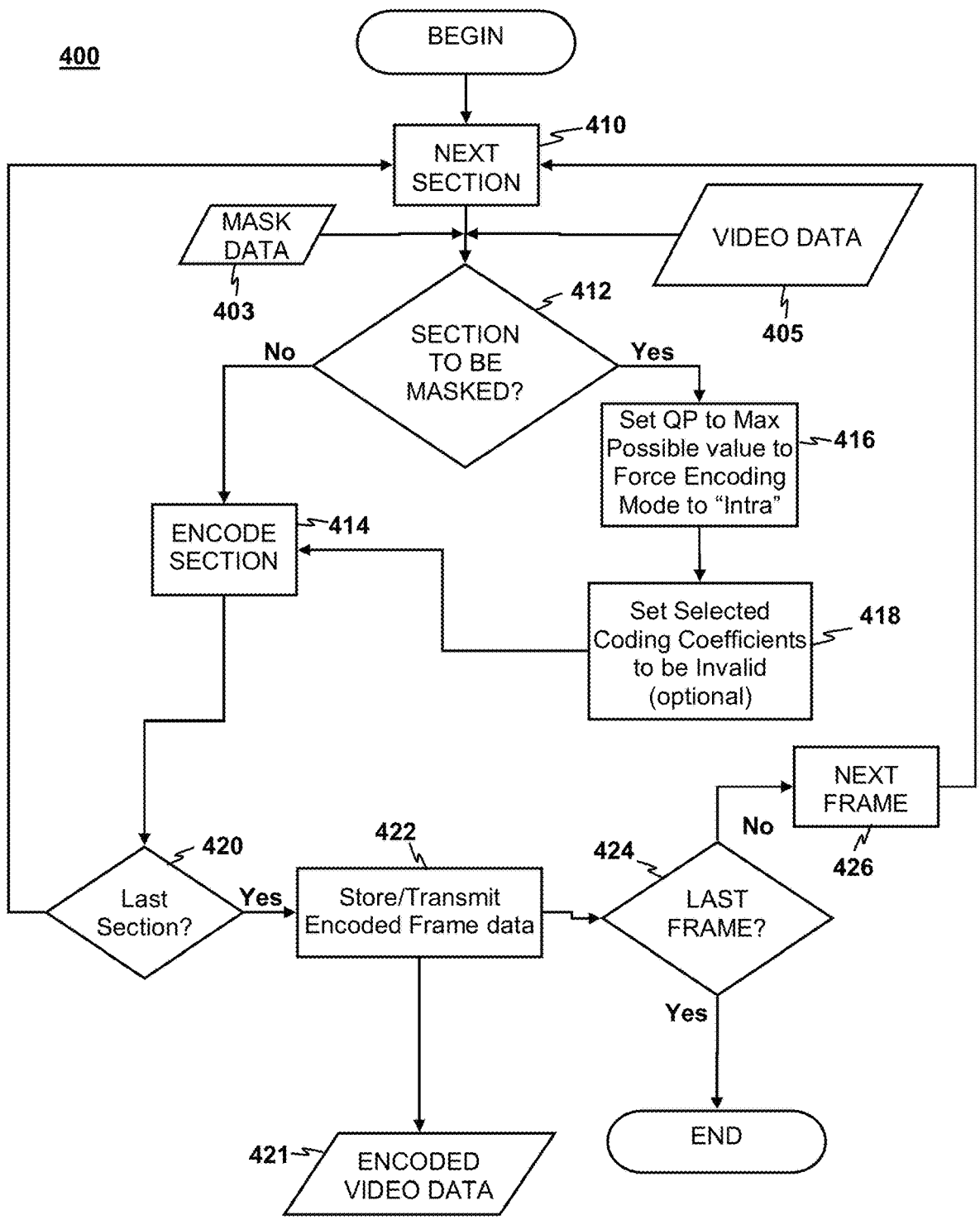
FIG. 4 is a flow diagram illustrating negative region of interest encoding of video data in accordance with aspects of the present disclosure.

Aspects of the present disclosure provide methods to encode certain regions of a video frame (negative regions of interest) in a manner that results in obscuring of these regions as a result of the coding parameters selected for the section or sections corresponding to these regions. FIG. 4 shows a method for encoding negative regions of interest according. The method 400 begins by encoding a new section 410 of video data 405 representing a video stream. The system receives mask data 403 which informs the system of the frame or frames and section or sections which are to be obscured. By way of example and not by way of limitation the mask data may be the address or macroblock indices of the section that is intended to be obscured, the mask data may also include information about the particular frame that is desired to be obscured or may be synchronized with the encoding of the video stream such that each currently received section or frame also includes mask data representing the area of that particular frame that is to be obscured. In alternate embodiments the mask data may be a bitmap of the frame currently being encoded with portions representing areas to be obscured by the encoder. Alternatively, for a mask of known shape, pixel coordinates of specific locations on the mask may be used to determine the region to be masked. For example, if the mask is a rectangle, the pixel coordinates of the top-left and bottom-right (or top-right and bottom-left) vertices of the rectangle can be used to determine the region to be masked. Furthermore, the mask data 403 may include mask data that is not provided by the user, and is instead auto-generated based on analysis of the input digital frame. By way of example, and not by way of limitation, mask data may be generated automatically based on routines used to find faces or text in a frame, and mask only those regions. For example, it is possible to figure the mask data using machine learning technology (user's face, user's biological info, e.g. DOB, or user's typical use/search pattern, text/words, etc. The system determines whether the section currently being encoded is to be masked 412. By way of example and not by way of limitation the system may compare the current section and frame address to the mask data or may determine the location of blocks to be obscured from the mask data bit map. If the system determines at 412 that the section does not need to be obscured then it proceeds to encode the section 414 as normal.

If it is determined that the section is to be obscured then the system may begin by setting the QP value for the section to the maximum possible value 416. By way of example and not by way of limitation the system may be configured to bypass or ignore the QP determination step of encoding and use the maximum possible QP value. Additionally when the system determines that a section is to be obscured, it may force those sections to be Intra-coded sections. The Intra-coded sections may be any size, in some embodiments of the present disclosure the Intra-coded sections are 16×16 pixels. Other embodiments may have sections as small as 4×4 pixels as long as there is mode data for sections that size. Once the QP value has been set to maximum 416 the system may proceed to encode the section 414 as discussed above the section may be encoded as an Intra-coded section.

According to aspects of the present disclosure, by setting the QP to maximum and forced encoding as Intra-sections an obscured region of a frame may be created. According to additional aspects of this disclosure the regions may further be obscured by setting the Luma Coded Block Pattern (CBP) to 0 418. For the HEVC codec, the equivalent term is coded block flags (CBF). Setting CBP to 0 means the luma residual value is zero. The Luma residual value informs the system of how many AC coefficients are valid when calculating Discrete Cosign Transform (DCT) coefficients during the intra prediction stage image compression 204. Setting CBP=0 means none of AC coefficients are valid so when the decoder does the inverse DCT transform the values are different that they would otherwise have been and the resulting reconstructed section is more obfuscated. By way of example and not by way of limitation, a CBP of value may be set by to 0 after determination from the mask data that the section is to be obscured. If all the CBPs of a macroblock are zero, only the DC coefficients are used to generate the reconstructed macroblock Alternatively the system may be set to use an alternative CBP value when a section is determined from the mask data to be obscured.

Further obfuscation may be achieved according to aspects of the present disclosure by setting all of the coefficients created by DCT of the intra-prediction to 0. In this embodiment both the AC and DC coefficients are set to 0 resulting in a section that is a solid color without variation. By way of example and not by way of limitation the mask data may signal to the encoder that a particular section has both AC and DC coefficients that are 0 and the encoder may skip over DCT calculations by that particular block. Alternatively the encoder may perform DCT calculation and then set the AC and DC coefficients to 0 as determined from the mask data.

After the QP has been set to the maximum possible value 416, the encoding mode for the section (e.g., macroblock) has been forced to Intra coding, and the Coding Coefficients have been set to 0 418 the section will be encoded 414. As discussed above setting the coding coefficients to 0 may happen before encoding or concurrently with the encoding step as AC and DC coefficients are changed.

Once the section is encoded the system checks whether the section is the last section in the frame 420. If the currently encoded section is not the last section then the process begins again with the next section 410 in the frame. If the system determines that the currently encoded section is the last section of a frame it stores or transmits the frame 422. The system may store each frame together to generate encoded video data 421. Alternatively each frame may be transmitted over a network to generate and encoded video data stream 421.

In an alternative embodiment, setting the QP to maximum is not required. Forcing all the coefficients as 0 is enough to obscure the region, even if the QP is low. In another alternative embodiment, one could invalidate one or more encoding parameters for Chroma. For example, set a chroma coding block pattern to 0. By way of a more specific example, in the H.264/MPEG-AVC codec one could force the chroma sample prediction mode to be I_PRED_CHROMA_DC, set the Chroma Coded Block Pattern as 0, and the number of non-zero DC coefficients as 0 for those sections that are to be obscured.

In either case after the frame has been stored or transmitted the system determines whether the frame is last of the video sequence 424. If the frame is the last in the video sequence the method ends. If the system determines that the currently encoded frame is not the last frame in the video sequence then the system moves to the next frame 426 in the video sequence and begins encoding the first section 410 of the new frame.

Figure 5:
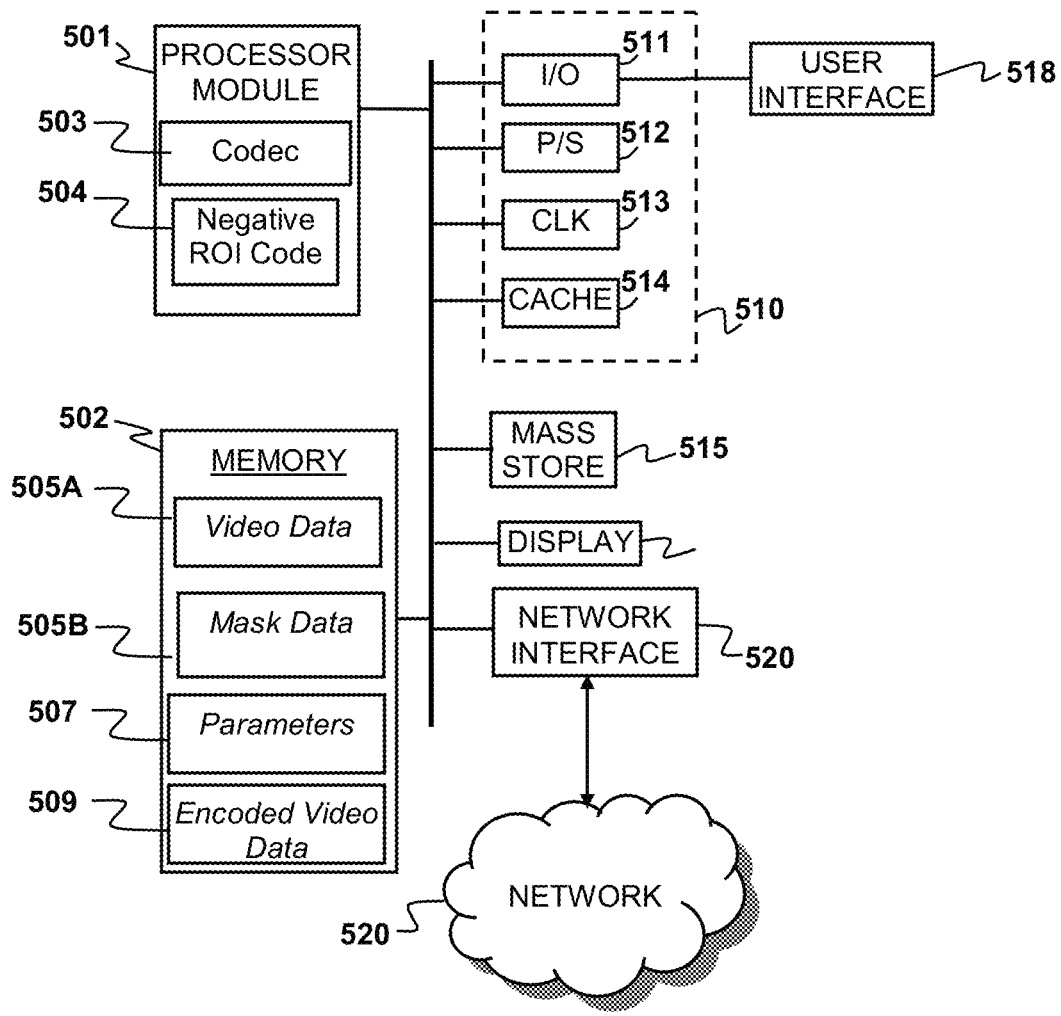
FIG. 5 is a block diagram illustrating an apparatus for encoding and/or decoding a digital picture configured to implement negative region of interest coding according to aspects of the present disclosure.

By way of example, and not by way of limitation, FIG. 5 illustrates a block diagram of a computer system 500 that may be used to implement aspects of the present disclosure. According to aspects of the present disclosure, the system 500 may be an embedded system, mobile phone, personal computer, tablet computer, portable game device, workstation, game console, and the like. The system 500 generally may include a processor module 501 and a memory 502. The processor module 501 may include one or more processor cores, e.g., in single core, dual core, quad core, processor-coprocessor, CPU-GPU, or Cell processor architectures.

The memory 502 may be in the form of an integrated circuit, e.g., RAM, DRAM, ROM, and the like. The memory may also be a main memory that is accessible by all of the processor cores in the processor module 501. In some embodiments, the processor module 501 may have local memories associated with one or more processor cores or one or more co-processors. A codec program 503 may be stored in the main memory 502 in the form of processor readable instructions that can be executed on the processor module 501. The codec 503 may be configured to encode digital pictures. By way of example, and not by way of limitation, the codec 503 may be configured to encode digital pictures or sections of digital pictures as discussed above with respect to FIG. 2 and FIG. 4. The codec 503 may also be configured to decode encoded digital pictures, e.g., as described above with respect to FIG. 3. A negative ROI handling program 504 may be used to set encoding parameters 507 for selected sections of video frame data 505A and mask data 505B in conjunction with the codec 503 to generate encoded video data 509, as described with respect to FIG. 4. The codec 503 and negative ROI handling program 504 may be written in any suitable processor readable language, e.g., C, C++, JAVA, Assembly, MATLAB, FORTRAN and a number of other languages.

Input video frame data 505A and mask data 505B, encoding parameters 507, and encoded video data 509 may be stored in memory 502. The encoding parameters 509 may include, e.g., CBP values, transform coefficients, prediction parameters, QP, values, and/or information useable to determine such parameters. An example of the latter may be a λ versus QP table that remains fixed during the encoding of a picture or over the course of encoding multiple pictures. During execution of the codec 503, program 504, portions of program code, frame data 505A, mask data 505B and/or encoding parameters 507 may be loaded into the memory 502 or the local stores of processor cores for processing by the processor 501. By way of example, and not by way of limitation, the frame data 505A may include input frames (e.g., video or audio frames), or sections thereof, before encoding or decoding or at intermediate stages of encoding or decoding. In the case of encoding, the data corresponding to the input frame data 505A may include buffered portions of streaming data, e.g., unencoded frames or portions thereof. In the case of decoding, the base data 505A and enhancement data 505B may include input data in the form of un-decoded sections, sections that have been decoded, but not post-processed and sections that have been decoded and post-processed. Such input data may include data packets containing data representing one or more coded sections of one or more digital pictures, coded digital audio digital frames, or other coded streaming data. By way of example, and not by way of limitation, such data packets may include a set of transform coefficients and a partial set of prediction parameters. These various sections may be stored in one or more buffers. In particular, decoded and/or post processed sections may be stored in an output picture buffer implemented in the memory 502.

The system 500 may also include well-known support functions 510, such as input/output (I/O) elements 511, power supplies (P/S) 512, a clock (CLK) 513 and cache 514. The apparatus 500 may optionally include a mass storage device 515 such as a disk drive, CD-ROM drive, tape drive, or the like to store programs and/or data. The device 800 may also optionally include a display unit 516 and user interface unit 518 to facilitate interaction between the apparatus 500 and a user. The display unit 516 may be in the form of a cathode ray tube (CRT) or flat panel screen that displays text, numerals, graphical symbols or images. The user interface 518 may include a keyboard, mouse, joystick, light pen, or other device that may be used in conjunction with a graphical user interface (GUI). The apparatus 500 may also include a network interface 520 to enable the device to communicate with other devices over a network 522, such as the internet. These components may be implemented in hardware, software, or firmware, or some combination of two or more of these.

By way of example, and not by way of limitation, the system 500 may transmit encoded or unencoded streaming data to other devices connected to the network 522 or receive encoded or unencoded streaming data from such devices via the network interface 520. In a particular implementation, encoded streaming data in the form of one or more encoded sections of a digital picture and/or one or more frames of encoded video may be transmitted from the system over the network 522. To implement transmitting or receiving streaming data, the processor module may execute instructions implementing a network protocol stack.

By way of example, and not by way of limitation, digital pictures may be generated with a digital camera, which may be part of the user interface 518 or which may be a separate peripheral coupled to the system 500, e.g., via the I/O elements 511. According to some aspects, the digital pictures may be generated by a software application executed by the processor module 501.

Using the proposed approach, visually pleasing blurring in the region of interest could be achieved without modifying the original content. This technique could be integrated into the encoding process without requiring a pre-processing stage prior to encoding.

The degree of obscuring depends partly on the prediction mode used. For example, forcing macroblocks of a desired region to be encoded as Intra does obscure the region. However, it has been observed that using only Intra 16×16 DC prediction mode gave the best results.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for encoding one or more input digital frames, comprising:

comparing frame data to mask data for one or more sections of an input digital frame to determine whether or not a given section of the input digital frame is to be obscured;

for each section of the input digital frame that is to be obscured, setting one or more encoding parameters to values that result in corresponding obscured sections when decoded after encoding, wherein setting the one or more encoding parameters to values that result in corresponding obscured sections includes invalidating at least one of the one or more encoding parameter values;

encoding the one or more sections of the input digital frame to generate corresponding encoded frame data; and storing or transmitting the encoded frame data.

2. The method of claim 1 wherein the mask data is a bitmap that describes the sections to be obscured.

3. The method from claim 2 wherein the bitmap is a binary bitmap.

4. The method from claim 1 wherein mask data describes the indices of the section to be obscured.

5. The method of claim 1 wherein setting the one or more encoding parameters to values that result in corresponding obscured sections includes setting a Quantization Parameter to a maximum possible value.

6. The method of claim 1 wherein invalidating at least one of the one or more encoding parameter values comprises setting a luma coding block pattern to 0.

7. The method of claim 1 wherein setting the one or more encoding parameters to 2 values that result in corresponding obscured sections includes setting AC and DC coefficients to 0.

8. The method from claim 7 wherein the AC and DC coefficients are set to 0 during encoding.

9. The method from claim 1 wherein each section that is to be obscured is exclusively 2 encoded as Intra-coded section.

10. The method of claim 1, wherein setting the one or more encoding parameters to 2 values that result in corresponding obscured sections includes invalidating one or more encoding parameters for Chroma.

11. The method of claim 10, wherein invalidating one or more encoding parameters for 2 Chroma includes setting a chroma coding block pattern to 0.

12. The method of claim 10, wherein invalidating one or more encoding parameters for 2 Chroma includes setting a number of non-zero DC coefficients to 0.

13. The method of claim 10, wherein invalidating one or more encoding parameters for 2 Chroma includes setting a chroma coding block pattern to 0 and setting a number of non-zero DC coefficients to 0.

14. A system, comprising:
a processor module,
a memory coupled to the processor, wherein the memory contains executable instructions configured to implement a method, the method comprising:

comparing frame data to mask data for one or more sections of an input digital frame to determine whether or not a given section of the input digital frame is to be obscured;

for each section of the input digital frame that is to be obscured, setting one or more encoding parameters to values that result in corresponding obscured sections when decoded after encoding, wherein setting the one or more encoding parameters to values that result in corresponding obscured sections includes invalidating at least one of the one or more encoding parameter values;

encoding the one or more sections of the input digital frame to generate corresponding encoded frame data; and storing or transmitting the encoded frame data.

15. The system of claim 14 wherein the mask data is a bitmap that describes the sections to be obscured.

16. The system from claim 15 wherein the bitmap is a binary bitmap.

17. The system from claim 14 wherein mask data describes the indices of 2 the section to be obscured.

18. The system of claim 14 wherein setting the one or more encoding parameters to values that result in corresponding obscured sections comprising setting a Quantization Parameter to a maximum possible value.

19. The system of claim 14 wherein invalidating at least one of the one or more encoding parameter values comprises setting a luma coding block pattern to 0.

20. The system of claim 14 wherein setting the one or more encoding parameters to values that result in corresponding obscured sections comprising setting AC and DC coefficients to 0.

21. The system from claim 20 wherein the AC and DC coefficients are set to 0 during encoding.

22. A non-transitory computer readable medium having embodied therein computer executable instructions configured to implement a method, the method comprising:

comparing frame data to mask data for one or more sections of an input digital frame to determine whether or not a given section of the input digital frame is to be obscured;

for each section of the input digital frame that is to be obscured, setting one or more encoding parameters to values that result in corresponding obscured sections when decoded after encoding, wherein setting the one or more encoding parameters to values that result in corresponding obscured sections includes invalidating at least one of the one or more encoding parameter values; encoding the one or more sections of the input digital frame to generate corresponding encoded frame data; and storing or transmitting the encoded frame data.

* * * * *